United States Patent
Aine et al.

(10) Patent No.: US 9,962,873 B2
(45) Date of Patent: May 8, 2018

(54) INJECTION MOLDING APPARATUS AND METHOD OF MAKING FOAMED INJECTION MOLDED PRODUCT

(71) Applicant: Kevin Bradley Aine, Strongsville, OH (US)

(72) Inventors: Kevin Bradley Aine, Strongsville, OH (US); David Vereecken, Akron, OH (US)

(73) Assignee: Kevin Bradley Aine, Strongsville, OH (US)

( * ) Notice: Subject to any disclaimer, the term of this patent is extended or adjusted under 35 U.S.C. 154(b) by 610 days.

(21) Appl. No.: 14/374,758

(22) PCT Filed: Jan. 25, 2013

(86) PCT No.: PCT/US2013/023053
§ 371 (c)(1),
(2) Date: Jul. 25, 2014

(87) PCT Pub. No.: WO2013/112783
PCT Pub. Date: Aug. 1, 2013

(65) Prior Publication Data
US 2015/0008608 A1    Jan. 8, 2015

Related U.S. Application Data

(60) Provisional application No. 61/590,427, filed on Jan. 25, 2012.

(51) Int. Cl.
*B29C 45/17* (2006.01)
*B29C 44/10* (2006.01)
(Continued)

(52) U.S. Cl.
CPC ........ *B29C 45/1703* (2013.01); *B29C 44/105* (2013.01); *B29C 45/77* (2013.01); *B29K 2023/00* (2013.01)

(58) Field of Classification Search
CPC .......... B29C 44/105; B29C 2045/0089; B29C 45/02; B29C 45/1704; B29C 45/1705;
(Continued)

(56) References Cited

U.S. PATENT DOCUMENTS 4,129,635 A    12/1978 Yasuike et al.
5,173,241 A    12/1992 Shibuya et al.
(Continued)

FOREIGN PATENT DOCUMENTS

| AT | 502381 | 3/2007 |
| JP | H08 11151 | 1/1996 |
| JP | 2009241537 | 10/2009 |

OTHER PUBLICATIONS

PCT/US2013/023053; PCT International Search Report and Written Opinion of the International Searching Authority dated Apr. 23, 2013.
(Continued)

*Primary Examiner* — Stella K Yi
(74) *Attorney, Agent, or Firm* — Renner, Otto, Boisselle & Sklar, LLP

(57) ABSTRACT

A method and apparatus for injection molding a foamed product. A short shot of formable resin is injected into a cavity (124) defined by respective inner surfaces (134,136) of a plurality of molding plates (120,122) at an amount less than a volume of the cavity (124), the resin comprising a chemical foaming agent. The injected resin is allowed to foam for a predetermined period of time, during which the injected foamable resin foams and expands to substantially fill the cavity (124) and a portion of an outer surface face of the foamable resin contacts the respective inner surfaces (134,136) of the molding plates (120,122). Pressurized gas is injected into the cavity (124) after the predetermined time has elapsed to urge the skinned outer surface of the foamed (Continued)

resin against the inner surfaces (134,136) of the molding plates (120,122).

20 Claims, 6 Drawing Sheets

(51) Int. Cl.
*B29C 45/77* (2006.01)
*B29K 23/00* (2006.01)

(58) Field of Classification Search
CPC ... B29C 44/0415; B29C 44/18; B29C 44/421; B29C 44/588
See application file for complete search history.

(56) References Cited

U.S. PATENT DOCUMENTS

| | | |
|---|---|---|
| 5,200,127 A | 4/1993 | Nelson |
| 5,667,738 A | 9/1997 | Krajcir |
| 6,063,315 A | 5/2000 | Keller et al. |
| 6,099,949 A | 8/2000 | Nomura et al. |
| 6,124,770 A | 9/2000 | Sakamoto et al. |
| 6,866,811 B2 | 3/2005 | Kayano et al. |

OTHER PUBLICATIONS

PCT/US2013/023053; PCT International Preliminary Report on Patentability dated Apr. 17, 2014.

INJECTION MOLDING APPARATUS AND METHOD OF MAKING FOAMED INJECTION MOLDED PRODUCT

RELATED APPLICATION DATA

This application is a national phase of International Application No. PCT/US2013/023053 filed Jan. 25, 2013 and published in the English language and which claims the benefit of U.S. Provisional Patent Application No. 61/590,427, filed Jan. 25, 2012, the disclosures of which are incorporated herein by reference in their entireties.

TECHNICAL FIELD

The technology of the present disclosure relates generally to injection molding and, more particularly, to an injection molding apparatus and method for making a foamed injection molded product.

BACKGROUND

Various injection molded products are produced using a process commonly referred to as a "full shot" injection molding process, in which a molten thermoplastic resin is injected into an injection mold cavity in an amount sufficient to fill the cavity (i.e., a "full shot" of resin). However, many specific applications require these products to be produced at a reduced weight while maintaining their respective physical properties.

One way to reduce the weight of an injection molded product is to form the product from a foamable resin. This reduces the amount of resin required to form the product, thereby reducing the overall weight of the product. Foamed injection molded products may be produced using a "short shot" injection molding process, in which a foamable resin is injected into the injection mold cavity in an amount less than the volume of the cavity (i.e., a "short shot" of resin), and the foamable resin is allowed to expand in the cavity. But the products formed by this process lack the aesthetic characteristics of their full shot counterpart, as the foaming resin lacks sufficient force to pack itself against the surface of the cavity.

Gas assist has generally been used to provide pressurized gas for assisting in packing resin against the cavity walls of an injection mold. But gas assist is generally ineffective for use with a foamable resin, as the porosity of the foaming resin allows the gas to pass through the resin like a sponge. Prior attempts to use gas assist with a foamable resin have therefore been limited by the amount of foaming that can occur prior to the use of gas assist. As such, the amount of resin used in the injection molding process must be sufficient (e.g., to prevent the occurrence of a blow out when applying the gas assist), thereby limiting the weight reduction achieved.

SUMMARY OF THE INVENTION

The present disclosure provides an apparatus and method for producing a light weight, foamed injection molded product. The injection molding apparatus of the present disclosure allows for the use of chemical foaming agent and gas assist together in an unconventional complementary manner. The injection molded products produced by the process of the present disclosure possess the physical properties and aesthetic appearance of a similar injection molded product produced by a full shot and gas assist injection molding processes, while providing the weight reduction of an injection molded product produced by a short shot injection molding process.

In accordance with one aspect of the present disclosure, a method of injection molding a foamed injection molded product includes: injecting a short shot of foamable resin into a cavity defined by respective inner surfaces of a plurality of molding plates at an amount less than a volume of the cavity, the resin comprising a chemical foaming agent; allowing the injected resin to foam for a predetermined period of time, during which the injected foamable resin foams and expands to substantially fill the cavity and a portion of an outer surface of the foamable resin contacts the respective inner surfaces of the molding plates; and injecting pressurized gas into the cavity after the predetermined time has elapsed to urge the outer surface of the foamable resin against the inner surfaces of the molding plates.

In one embodiment, the short shot of foamable resin is injected at an amount from about 25% to about 75% of a volume defined by the cavity of the inner surfaces. In another embodiment, the short shot of foamable resin is injected at an amount from about 25% to about 35% of a volume defined by the cavity of the inner surfaces.

In one embodiment, at least about 50% of the outer surface of the foamable resin is in contact with the respective inner surfaces of the molding plates prior to injecting the pressurized gas into the cavity.

In one embodiment, the predetermined time is longer than about 10 seconds. In another embodiment, the predetermined time is longer than about 15 seconds.

In one embodiment, pressure provided by the pressurized gas is maintained in the cavity for an additional predetermined time. In another embodiment, the additional predetermined time is at least 2 seconds.

In one embodiment, at least one of the molding plates comprises a gate having a diameter ranging from about 0.120 inches to about 0.250 inches.

In one embodiment, a temperature of the plurality of molding plates ranges from about 380° F. to about 400° F.

In one embodiment, the foamable resin comprises: about 80 wt % to about 90 wt % of a high density polyolefin; about 10 wt % to about 20 wt % of a ultra low density polyolefin elastomer; and about 2 wt % of the chemical foaming agent.

In accordance with another aspect of the present disclosure, an injection molding apparatus for forming a foamed product includes: a cavity defined by respective inner surfaces of a plurality of molding plates; and a controller configured to perform the steps of: injecting a short shot of foamable resin into the cavity at an amount less than a volume of the cavity, the resin comprising a chemical foaming agent; allowing the injected resin to foam for a predetermined period of time, during which the injected foamable resin foams and expands to substantially fill the cavity and a portion of an outer surface of the foamable resin contacts the respective inner surfaces of the molding plates; and injecting the pressurized gas into the cavity after the predetermined time has elapsed to urge the skinned outer surface of the foamable resin against the inner surfaces of the molding plates.

In one embodiment, the controller is configured to inject the short shot of foamable resin at an amount from about 25% to about 75% of a volume defined by the cavity of the inner surfaces. In another embodiment, the controller is configured to inject the short shot of foamable resin at an amount from about 25% to about 35% of a volume defined by the cavity of the inner surfaces.

In one embodiment, at least about 50% of the outer surface of the foamable resin is in contact with the respective inner surfaces of the molding plates prior to injecting the pressurized gas into the cavity.

In one embodiment, the predetermined time is longer than about 10 seconds.

In one embodiment, the controller is configured to maintain pressure provided by the pressurized gas in the cavity for an additional predetermined time. In another embodiment, the additional predetermined time is at least 2 seconds.

In one embodiment, at least one of the molding plates comprises a gate having a diameter ranging from about 0.120 inches to about 0.250 inches.

In one embodiment, a temperature of the plurality of molding plates ranges from about 380° F. to about 400° F.

The foregoing and other features of the disclosure are hereinafter described in greater detail with reference to the accompanying drawings.

DESCRIPTION

Figure 1:
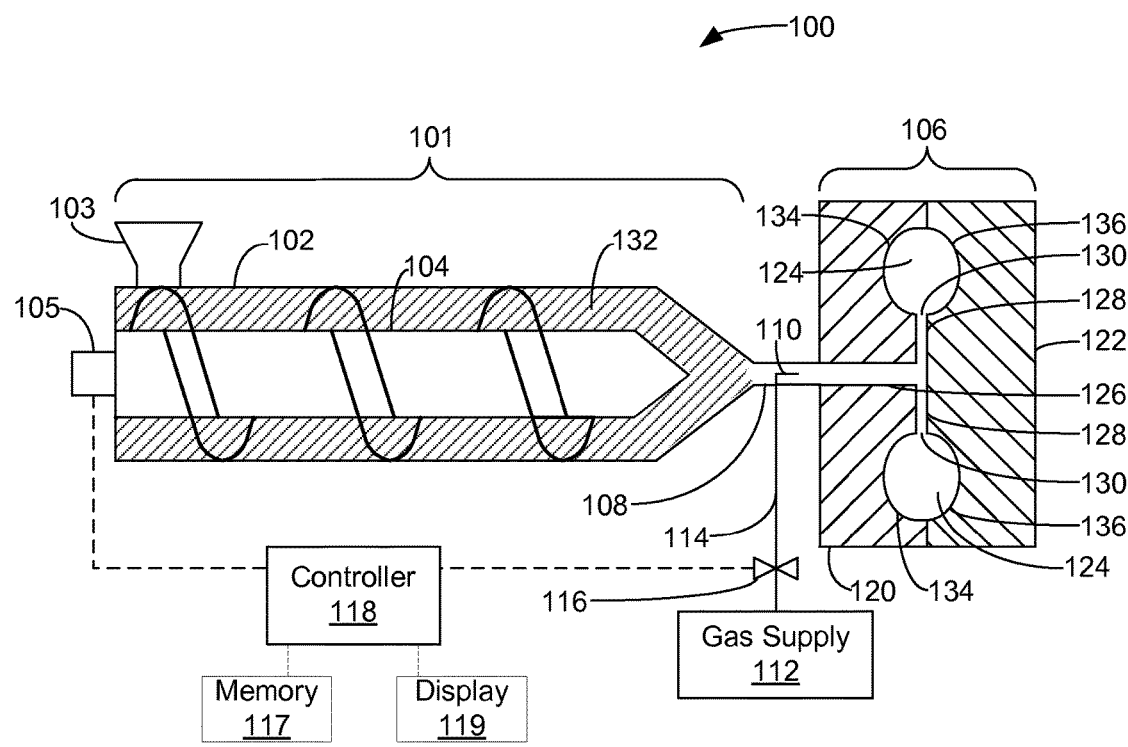
FIG. 1 is a partial cross-sectional schematic diagram showing parts of an exemplary injection molding apparatus.

In the description that follows, like components have been given the same reference numerals, regardless of whether they are shown in different embodiments. To illustrate an embodiment(s) of the present invention in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

Referring now in detail to the drawings and initially to FIG. 1, a schematic diagram of an exemplary injection molding apparatus is shown generally at 100.

In the illustrated embodiment, the injection molding apparatus 100 includes a heated screw-type plunger 101 having a heated cylinder 102 that is fed by a hopper 103, and screw 104 that is driven by motor 105 to convey molten foamable resin 132 along the length of the heated cylinder 102 to be injected into the mold 106. While the injection molding apparatus 100 will be illustrated and described chiefly in this context, it is to be understood that injection molding apparatus may be configured to inject molten foamable resin 132 into the injection mold 106 by any suitable manner (e.g., by use of an injection ram). The particular design of the heated screw-type plunger 101 of the injection molding apparatus 100 is not material to the invention in its broadest sense. The specific structure and functionality of the plunger 101, cylinder 102, hopper 103, and screw 104 are conventional and therefore will not be described in detail.

The heated screw-type plunger 101 is coupled to a nozzle 108, and the nozzle 108 is coupled the injection mold 106 such that the heated screw-type plunger 101 and the injection mold 106 are in fluid communication. Foamable resin 132 conveyed along the heated screw-type plunger 101 is forced (via rotation of the screw 104) through the nozzle 108 to the injection mold 106.

A gas injection nozzle 110 is disposed in the nozzle 108 for injecting pressurized gas into the injection mold 106. The gas injection nozzle 110 is connected to a gas supply 112 via gas supply line 114, and the supply and/or pressure of pressurized gas to the gas injection nozzle 110 may be regulated by a valve 116 located along the gas supply line 114. The gas supplied to the injection mold 106 may be any suitable gas. Examples of suitable gas for use in the injection molding process of the present disclosure include nitrogen, carbon dioxide, and air.

A controller 118 controls the overall operation of the injection molding apparatus 100. For example, the controller 118 controls the temperature of the heated cylinder 102, rotation of the screw 104, and/or supply of the pressurized gas (via valve 116) to the gas injection nozzle 110. The controller 118 may be a part of a computer-based system capable of executing computer applications (e.g., software programs). In one embodiment, the controller 118 is embodied as one or more computer programs (e.g., one or more software applications including compilations of executable code). The computer program(s) may be stored on a non-transitory machine (e.g., computer) readable medium, such as a memory 117 in the form of a magnetic, optical or electronic storage device (e.g., hard disk, optical disk, flash memory, etc.).

The injection molding apparatus 100 may also include one or more peripheral devices 119 (e.g., a display, keyboard, mouse, etc.) that allow a user of the injection molding apparatus 100 to interface with and operate the injection molding apparatus 100. In one embodiment, a display and keyboard may be present as peripheral devices 119 to allow a user to enter one or more operating parameters that may be utilized by the controller 118 in controlling the overall operation of the injection molding apparatus 100.

An injection mold 106 is in fluid contact with the nozzle 108 of the injection molding apparatus 100 (e.g., via sprue 126). In one embodiment, the injection molding apparatus 100 includes a press (not illustrated) that applies a force to the injection mold 106 and retains the injection mold 106 during the injection molding process. The mold 106 includes a first molding plate 120 and a second molding plate 122 that, when joined (or pressed) together, form a cavity 124 for injection molding a product. As described in greater detail below with reference to FIGS. 2 and 2A, the cavity 124 is defined by respective inner surfaces 134, 136 of the molding plates 120, 124. In the illustrated embodiment, the first molding plate 120 is stationary, and the second molding plate 122 is movable with respect to the first molding plate 120 (e.g., for removal of a formed injection molded product). Movement of the second molding plate 122 may be performed using any suitable mechanism known in the art, and control of such movement may be performed using the controller 118. Alignment of the molding plates 120, 122 (e.g., during movement of the second molding plate 122) may be accomplished via alignment members 123, 125. In one embodiment, alignment member 123 is a shaft and alignment member 125 is a corresponding through-hole.

The injection mold 106 includes a sprue 126 that is fluidly coupled at one end to the nozzle 108. The other end of sprue 126 is fluidly coupled to a respective end of one or more runners 128, and the other end of each runner 128 is fluidly coupled to a respective gate 130. Each gate 130 is fluidly coupled to the cavity 124 formed by the first molding plate 120 and the second molding plate 122. Hence, when the first molding plate 120 and a second molding plate 122 are retained by the injection molding apparatus 100 and form the cavity 124, the nozzle 108 is fluidly coupled to the cavity 124 via the sprue 126, runner (s) 128, and gate(s) 130. Other embodiments are contemplated in which the injection mold 106 includes a different arrangement. For example, the sprue 126 may coupled directly to a gate.

Figure 2:
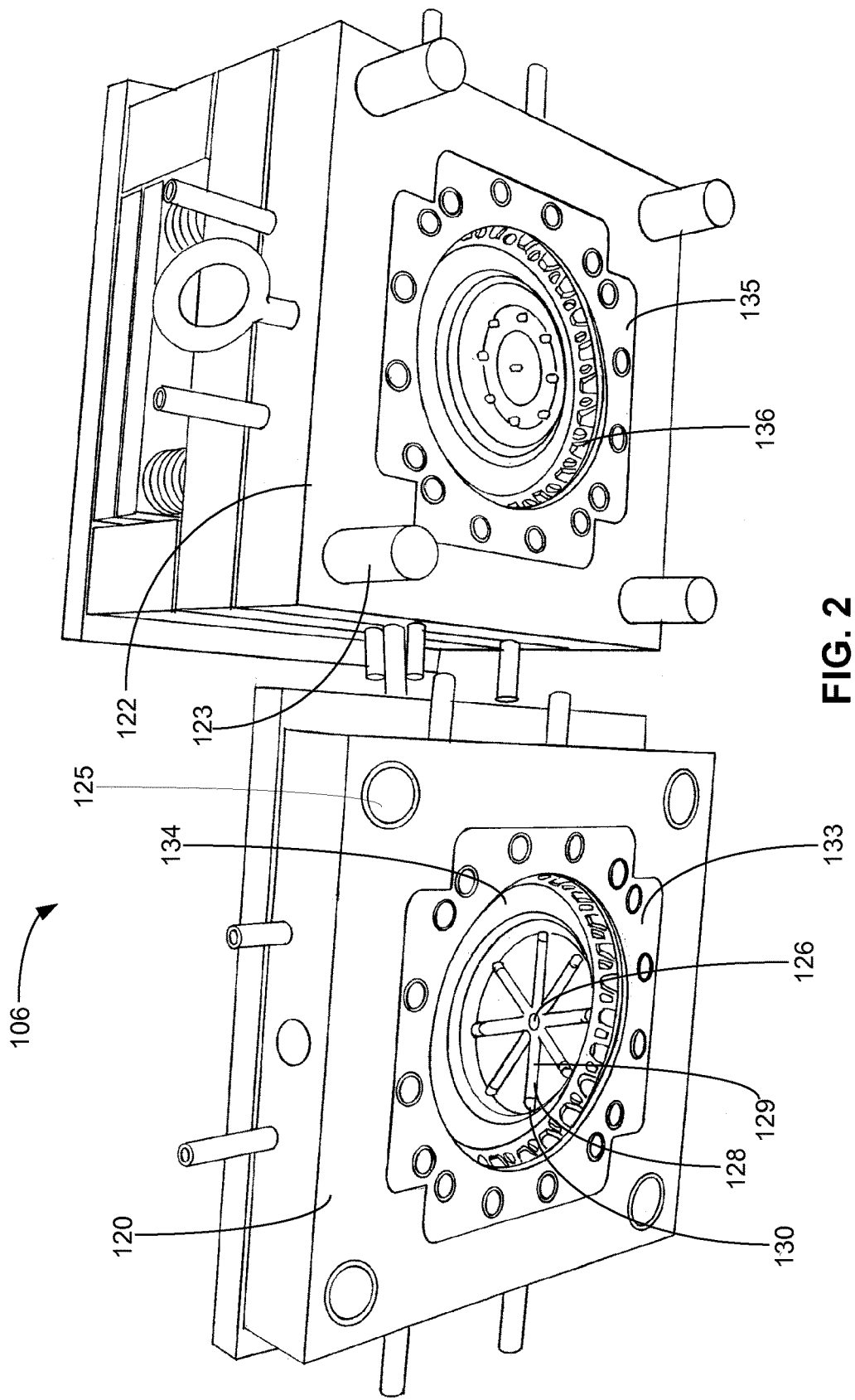
FIG. 2 is a schematic diagram of an exemplary injection mold.

FIG. 2 illustrates the first and second molding plates 120, 122 of an exemplary injection mold 106. The exemplary injection mold 106 of FIG. 2 may be used in conjunction with the injection molding apparatus 100 in performing the injection molding process of the present disclosure.

Figure 2A:
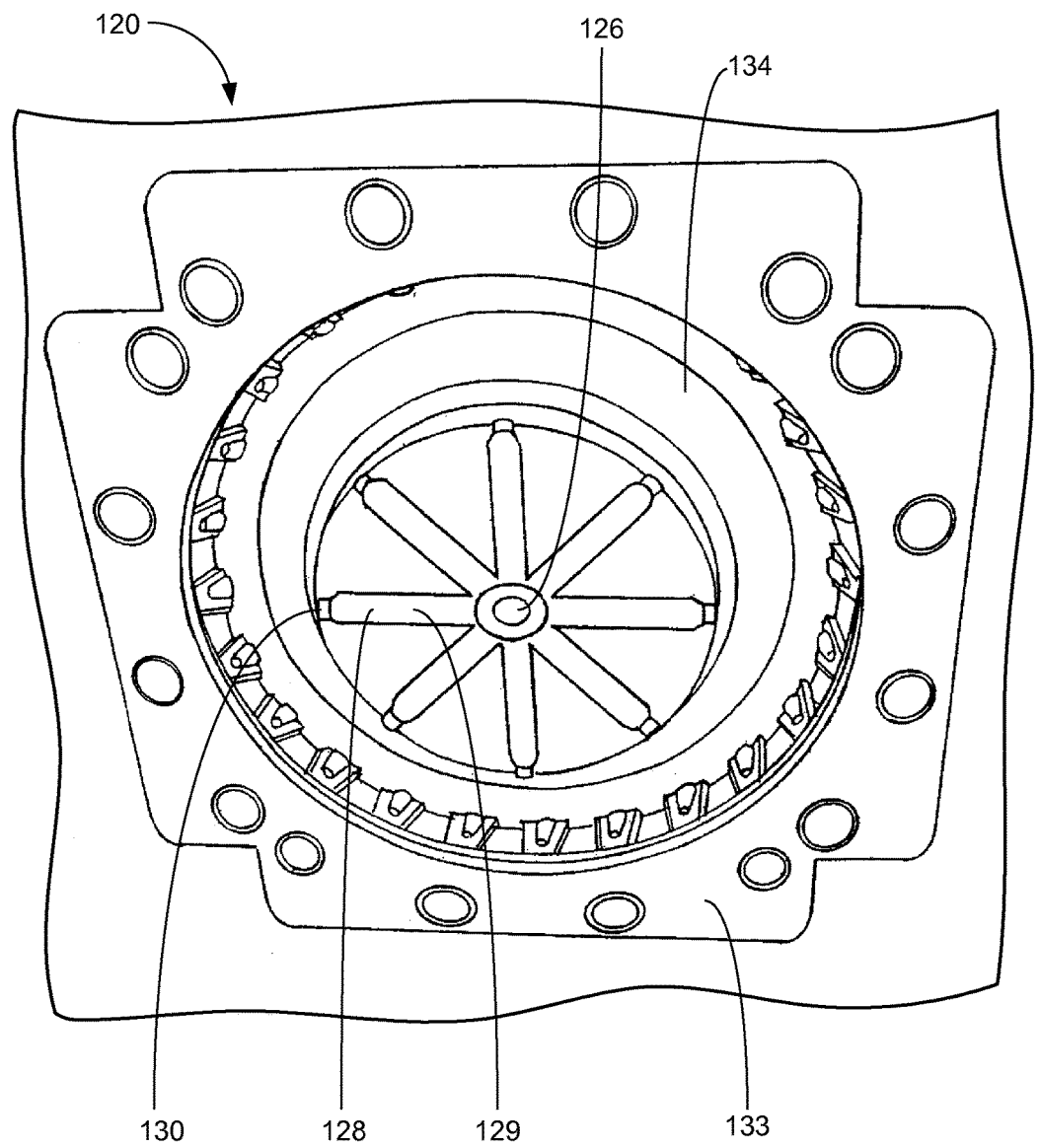
FIG. 2A is a schematic diagram of parts of an exemplary molding plate.

With additional reference to FIG. 2A, the first molding plate 120 includes sprue 126 that extends in a direction orthogonal to the inner face 133 of the first molding plate 102. Multiple channels 129 at the inner face 133 are fluidly coupled to the sprue 126 and extend in a direction orthogonal to the sprue 126. The first molding plate 120 further includes an inner surface 134 that forms a recess with respect to a plane defined by the inner face 133 of the first molding plate 120. Each channel 129 is in fluid communication with the recess. The inner surface 134 is configured to form the outer surface of a part of an injection molded product. In the illustrated example, the recess is configured to form a portion of an annular shape (e.g., a tire).

The second molding plate 122 includes an inner surface 136 that forms a recess with respect to a plane defined by the inner face 135 of the second molding plate 122. The inner surface 136 of the second molding plate 122 is configured to form the outer surface of a part of an injection molded product, and corresponds with the inner surface 134 of the first molding plate 120.

When the inner face 133 of the first molding plate 120 is brought into contact with the inner face 135 of the second molding plate 120, the respective inner surfaces 134, 136 form the cavity 124 for injection molding. The exemplary injection mold 106 is configured such that the cavity is formed in the shape of a tire (e.g., for a wagon, wheelbarrow, radio controlled car or airplane, etc.). In other embodiments, the cavity formed by the first molding plate 120 and the second molding plate 122 may be any suitable shape.

Figure 3:
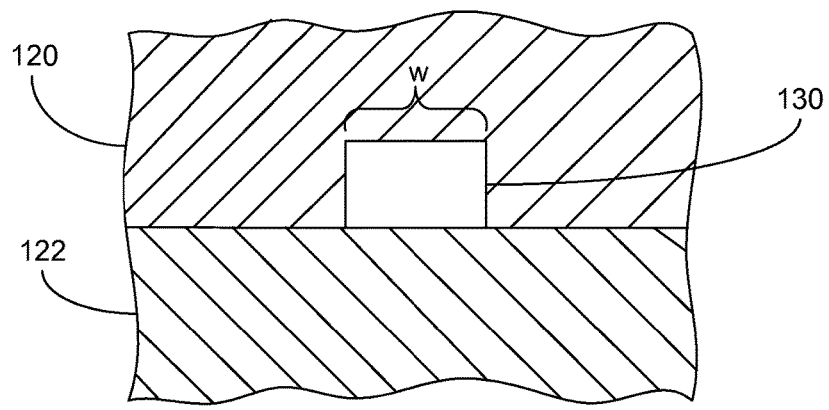
FIG. 3 is a cross-sectional schematic diagram of an exemplary gate of the injection mold of FIG. 2.

Each of the channels 129 of the first molding plate 120 is configured such that a respective runner 128 and gate 130 is formed when the inner face of the first molding plate 120 is brought into contact with the inner face of the second molding plate 122. Each gate 130 is in fluid communication with the cavity 124. FIG. 3 illustrates a cross-sectional view of an exemplary gate 130 of the injection mold of FIG. 2. In the illustrated embodiment, the gate 130 has a rectangular cross-sectional shape. In other embodiments, the gate 130 has other suitable cross-sectional shapes (e.g., circle, semi-circle, trapezoid, etc.). The size of the gate 130 is significantly larger (e.g., about ten times larger) than conventional gates used in similar injection molds. In one embodiment, the gate has a cross-sectional width w of about 0.16 inches. In other embodiments, the cross-sectional width w of the gate 130 may range from about 0.120 inches to about 0.250 inches. In still other embodiments, the cross-sectional width w of the gate 130 may range from about 0.16 inches to about 0.20 inches.

Conventionally, gates used in similar injection molds are at least an order of magnitude smaller than the gates of the present disclosure. Larger gates tend to leave a larger mark (or scar) on the part, and as a result, smaller gates are used to minimize imperfections of the injection molded product. However, the inventors have found that the delayed gate freeze off (or gate seal) provided by the use of a large gate 130 delays the time for gate freeze off (or gate seal) and allows for sufficient delay prior to the use of gas assist.

As discussed above, the foamed injection molded product is formed from a foamable resin 132. The term "foamable resin" as used herein refers to one or more thermoplastic resins in combination with one or more chemical foaming agents.

Any suitable thermoplastic resin may be utilized in the injection molding process of the present disclosure. In one example, suitable thermoplastic resins include polyolefins such as low-density polyethylene (LDPE), medium-density polyethylene (MDPE), linear low-density polyethylene (LLDPE), very-low-density polyethylene (VLDPE), ultra-low-density polyethylene (ULDPE), high-density polyethylene (HDPE), high-molecular-weight polyethylene (HMWPE), and ultra-high-molecular-weight polyethylene (UHMWPE). Other suitable thermoplastic resins include polyamide (PA or nylon), polybutylene terephthalate (PBT), polyethylene terephthalate (PET), polycarbonate (PC), polypropylene (PP), low-density polypropylene (LDPP), high-density polypropylene (HDPP), polyvinyl chloride (PVC), polymethylpentene (PMP), polybutene-1 (PB-1), polystyrene, styrene-acrylonitrile copolymer, styrene-acrylonitrile-butadiene copolymer, and polymethylmethacrylate. An example of a suitable, commercially available thermoplastic resin is ENGAGE™, available from The Dow Chemical Company.

The amount of thermoplastic resin present in the foamable resin may range from about 80.0 wt % to about 99.9 wt % of the foamable resin. In another embodiment, the amount of thermoplastic resin present in the foamable resin may range from about 90.0 wt % to about 99.9 wt % of the foamable resin. In another embodiment, the amount of thermoplastic resin present in the foamable resin may range from about 95.0 wt % to about 99.9 wt % of the foamable resin. In another embodiment, the amount of thermoplastic resin present in the foamable resin is about 98.0 wt %.

In embodiments that include more than one thermoplastic resin, the amounts of the different thermoplastic resins present in the foamable resin may vary. For example, the foamable resin may include from about 80.0 wt % to about 90.0 wt % high-density polyethylene and from about 10.0 wt % to about 20.0 wt % ultra-low-density polyethylene. In another embodiment, the foamable resin may include about 90.0 wt % high-density polyethylene and about 10.0 wt % ultra-low-density polyethylene.

Any suitable thermoplastic resin may be utilized in the injection molding process of the present disclosure. An example of a suitable, commercially available chemical foaming agent is HYDROCEROL®, available from Clariant. The amount of chemical foaming agent present in the foamable resin may range from about 0.1 wt % to about 10.0 wt % of the foamable resin. In another embodiment, the amount of chemical foaming agent present in the foamable resin may range from about 0.1 wt % to about 5.0 wt % of the foamable resin. In another embodiment, the chemical foaming agent is present in the amount of about 2.0 wt % of the foamable resin.

The foamable resin 132 may include one or more additional additives such as, for example, colorant, biocide, UV stabilizer, and the like. Each of the additional additives present in the may be present in the foamable resin from about 0.01 wt % to about 5.0 wt %.

The injection molding process in accordance with the present application will now be described with reference to FIGS. 4 and 5A-5D.

Figure 4:
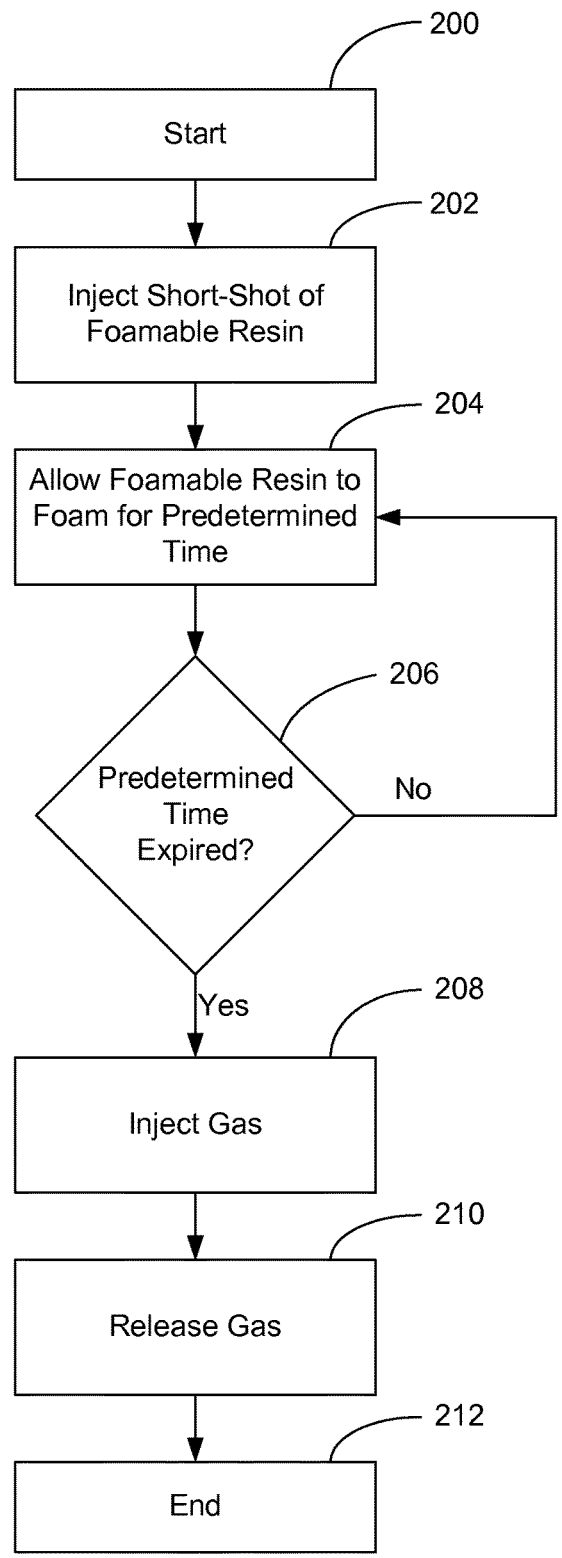
FIG. 4 is a flow diagram of an exemplary method of injection molding a foamed product.

FIG. 4 illustrates a flow diagram of an exemplary injection molding process of a foamed injection molded product. The exemplary process may be carried out, in part, by executing an embodiment of the controller 118. The exemplary process commences in block 200 upon the initialization of the injection molding apparatus (e.g., by a user). At block 202, a short shot of foamable resin 132 is injected into the cavity 124 formed by the inner surfaces 134, 136 of the respective molding plates 120, 122. With exemplary reference to FIGS. 1 and 5A, rotation of the screw 104 results in the foamable resin 132 being injected through the nozzle 108, sprue 126, runner 128, and gate 130, and into the cavity 124.

The amount (volume) of foamable resin 132 injected into the cavity 124 may be any suitable amount that allows for the injected foamable resin to foam and expand to fill substantially the entire cavity 124. In one embodiment, the short shot of foamable resin 132 is injected at an amount from about 25% to about 75% of a volume defined by the cavity 124 of the inner surfaces 134, 136. In another embodiment, the short shot of foamable resin 132 is injected at an amount from about 25% to about 35% of a volume defined by the cavity 124 of the inner surfaces 134, 136.

At block 204, injection of the foamable resin 132 is stopped and the injection molding process is suspended for a predetermined time. The predetermined time may be any amount of time that is sufficient to allow the foamable resin 132 to foam and expand to fill substantially the entire cavity 124, and for the outer surface 131 of the foamable resin 132 at the respective inner surfaces 134, 136 of the molding plates 120, 122. However, the predetermined time should not exceed an amount of time that results in freeze-off of the resin at the gate(s) 130. If gate freeze-off occurs, subsequent injection of pressurized gas will not be possible. In conventional injection molds, the gate size limits the predetermined time to an amount of time that is insufficient for the requisite foaming and skinning to occur. But in the injection mold of the present application, the size of the gate(s) 130 delays gate freeze-off and thereby allows for a sufficient predetermined amount of time. In one embodiment, the predetermined time is longer than about 10 seconds. In another embodiment, the predetermined time is longer than about 15 seconds. In another embodiment, the predetermined time is longer than about 20 seconds. In another embodiment, the predetermined time is from about 10 seconds to about 30 seconds. In another embodiment, the predetermined time is from about 15 seconds to about 30 seconds. In another embodiment, the predetermined time is from about 20 seconds to about 30 seconds.

The molding plates 120, 122 heat the chemical foaming agent included in the resin, thereby resulting in the formation of gas that, in turn, foams the resin. The temperature of the molding plates may be any suitable temperature for causing the chemical foaming agent to generate gas. The temperature of the molding plates may range, depending on the specific foamable resin utilized in the injection molding process. In one embodiment, a temperature of the plurality of molding plates ranges from about 160° F. to about 600° F. In another embodiment, a temperature of the plurality of molding plates ranges from about 200° F. to about 500° F. In another embodiment, a temperature of the plurality of molding plates ranges from about 380° F. to about 400° F.

Figure 5A:
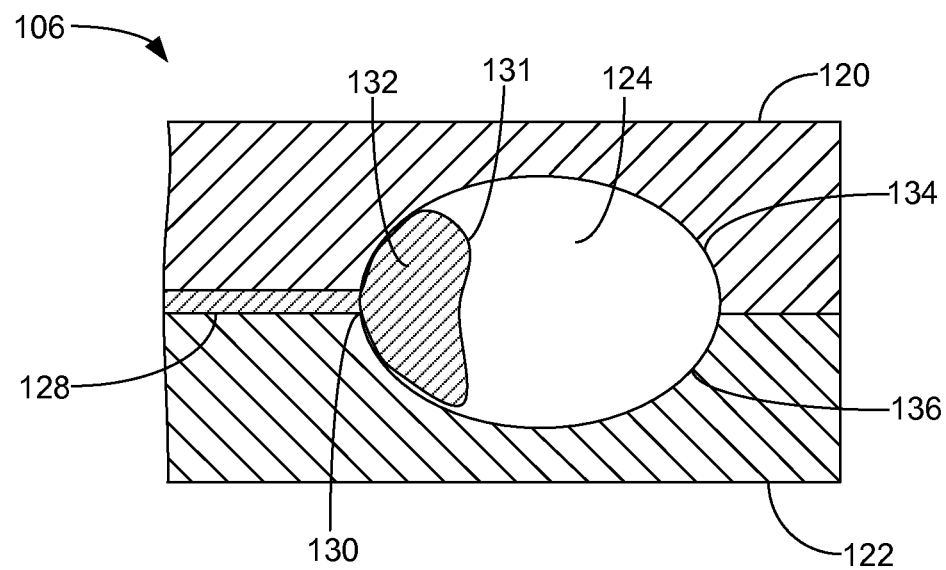
FIGS. 5A-5D are cross-sectional schematic diagrams of an exemplary injection mold shown partially cut away, illustrating the exemplary method of injection molding a foamed product of FIG. 4.
Figure 5B:
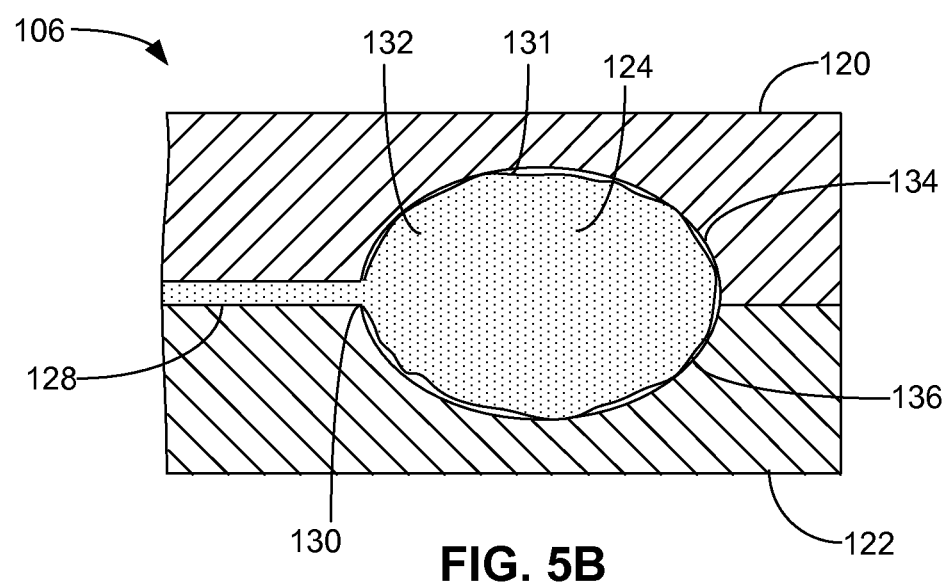

FIG. 5B illustrates the foaming of the foamable resin 132 in the cavity 124 during the predetermined time. Gas is generated, causing the foamable resin 132 to expand in the cavity toward the respective inner surfaces 134, 136. As illustrated, portions of the outer surface 131 of the expanding resin contacts portions of the inner surfaces 134, 136. In some embodiments, a skin may be formed at the outer surface 131 of the resin.

The outer surface is not completely in contact with the inner surfaces 134, 136 due to imperfections in the outer surface 131. In one embodiment, at least 50% of the outer surface of the foamed resign 132 is in contact with the respective inner surfaces 134, 136 of the molding plates 120, 122. In another embodiment, at least 70% of the outer surface of the foamed resign 132 is in contact with the respective inner surfaces 134, 136 of the molding plates 120, 122. In another embodiment, at least 85% of the outer surface of the foamed resign 132 is in contact with the respective inner surfaces 134, 136 of the molding plates 120, 122.

At block 206, a determination is made whether the predetermined time has expired. If the determination is negative, the process returns to block 204. If a positive determination is made, the process proceeds to block 208.

At block 208, pressurized gas is injected into the cavity 124 to assist in packing out the outer surface 131 of the foamable resin 132 against the inner surfaces 134, 136 of the respective molding plates 120, 122. Because this occurs after the predetermined time, this step may also be referred to as a delayed gas assist step. With exemplary reference to FIG. 1, opening of the valve 116 results in pressurized gas being injected from the gas injection nozzle 110, through sprue 126, runner 128, and gate 130, and into the cavity 124. The pressurized gas may be injected at any suitable pressure. In one embodiment, the pressure of the pressurized gas injected into the cavity may range from about 50 PSI to about 1100 PSI. In another embodiment, the pressure of the pressurized gas injected into the cavity may range from about 500 PSI to about 900 PSI. In another embodiment, the pressure of the pressurized gas injected into the cavity may range from about 600 PSI to about 800 PSI. In another embodiment, the pressurized gas is injected into the cavity at about 700 PSI.

Figure 5C:
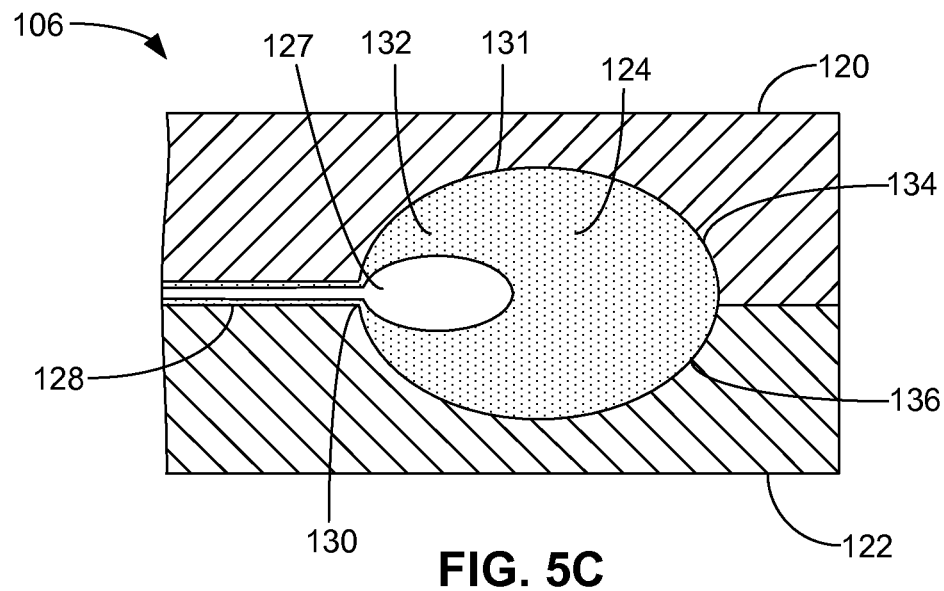

In some embodiments, such as that illustrated in FIG. 5C, injection of the pressurized gas results in formation of a void 127 in the foamable resin 132 within the runner 128 and the gate 130, as well as a portion of the cavity 124 proximate the gate 130. Formation of the void 127 assists in packing out the outer surface 131 of the foamable resin 132 against the inner surfaces 134, 136 of the respective molding plates 120, 122. In one example, the portion of the void 127 formed in the cavity 124 is isolated from other voids 127 respectively formed proximate the other gates 130. In another example, the portion of the void 127 formed in the cavity 124 is in fluid communication with one or more voids 127 respectively formed proximate the other gates 130.

The pressurized gas may also flow through the pores of the foamable resin 132 and exert a force on the outer surface 131 of the resin 132, thereby bringing the outer surface of the resin into intimate contact with the inner surfaces 134, 136 and removing the imperfections of the outer surface 131. In other embodiments (not illustrated), a void is not formed in the foamable resin 132, and the outer surface 131 of the foamable resin 132 is packed out against the inner surfaces 134, 136 of the respective molding plates 120, 122 via flow of the pressurized gas through the pores of the foamable resin 132 and exertion of force on the outer surface 131 of the resin 132.

The pressure provided by the pressurized gas may be maintained for an additional predetermined amount of time and subsequently released after the additional predetermined amount of time (e.g., via a pressure relief valve (not illustrated)). In one embodiment, the additional predetermined amount of time may range from about 2 seconds to about 30 seconds. In another embodiment, the additional predetermined amount of time may range from about 10 seconds to about 20 seconds. In another embodiment, the additional predetermined amount of time may be about 15 seconds.

Figure 5D:
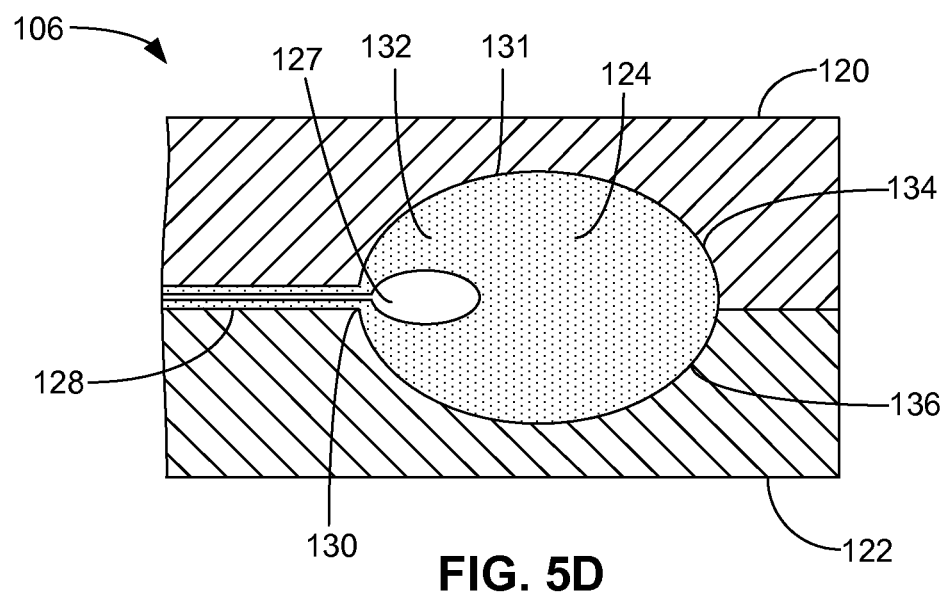

At block 210, the pressurized gas injected into the cavity 124 is released. Release of the pressurized gas may result in the reduction of the size of the void 127 (e.g., as a result of some decompression and/or further expansion of the foamable resin). For example, as illustrated in FIG. 5D, the void 127 has been reduced in size such that presence of the void 127 within the runner 128, the gate 130, and the cavity 124 proximate the gate 130 has been reduced in size. In other embodiments (not shown), the size of the void 127 is not reduced as a result of the release of the pressurized gas. In still other embodiments (not shown), the size of the void 127 is reduced completely (e.g., as a result of continued foaming of the foamable resin) so that the void 127 is not present in the injection molded product.

At block 212, the process is ended. The process provides an injection molded product formed from the foamable resin 132 having an aesthetically pleasing outer surface 131.

Embodiments of inventive compositions and methods are illustrated in the following examples. These examples are provided for illustrative purposes and are not considered limitations on the scope of inventive compositions and methods.

Example 1

A foamable resin formed from about 88 wt % high density polyolefin, about 10 wt % ENGAGE™ ultra low density polyethylene from The Dow Chemical Company, and about 2 wt % HYDROCEROL® chemical foaming agent from Clariant is injected into an injection mold in accordance with the present disclosure having a temperature of about 390° F. and being formed from two molding plates, similar to that illustrated in FIG. 2. The mold includes a plurality of gates, each gate having a cross-sectional width of about 0.16 inches.

The resin is injected into the cavity at an amount of about 35% of a volume defined by the cavity, and upon completion of the injection at this amount, the injection molding process is suspended for about 10 seconds. Delayed gas assist is applied upon the expiration of the 10 second time period at a pressure of about 700 PSI. The pressure is released after about 3 seconds, the molding plates are separated, and the foamed injection molded product is removed. The foamed injection molded product is light weight, resilient, and possesses minimal aesthetic imperfections.

Comparative Example 1

A resin formed from about 90 wt % high density polyolefin and about 10 wt % ENGAGE™ ultra low density polyethylene from The Dow Chemical Company is injected into a conventional injection mold having a temperature of about 390° F. and being formed from two molding plates. The mold includes a plurality of gates, each gate having a cross-sectional width of about 0.016 inches (approximately one tenth of the cross-sectional width of the gate in Example 1).

The resin is injected into the cavity at an amount of about 100% of a volume defined by the cavity. Upon completion of the injection, the molding plates are separated, and the injection molded product is removed.

By comparison, the foamed injection molded product of Example 1 is approximately 60% lighter than the injection molded product of Comparative Example 1. The foamed injection molded product of Example 1 also possesses the same cosmetic appearance as the injection molded product of Comparative Example 1.

Comparative Example 2

A foamable resin formed from about 88 wt % high density polyolefin, about 10 wt % ENGAGE™ ultra low density polyethylene from The Dow Chemical Company, and about 2 wt % HYDROCEROL® chemical foaming agent from Clariant is injected into a conventional injection mold as described in Comparative Example 1.

The resin is injected into the cavity at an amount of about 35% of a volume defined by the cavity, and upon completion of the injection at this amount, the resin is allowed to foam to completion. The molding plates are then separated and the foamed injection molded product is removed. The foamed injection molded product is light weight and resilient, but possesses unacceptable aesthetic imperfections when compared to the foamed injection molded product of Example 1 and the injection molded product of Comparative Example 1.

Comparative Example 3

A foamable resin formed from about 88 wt % high density polyolefin, about 10 wt % ENGAGE™ ultra low density polyethylene from The Dow Chemical Company, and about 2 wt % HYDROCEROL® chemical foaming agent from Clariant is injected into a conventional injection mold as described in Comparative Example 1.

The resin is injected into the cavity at an amount of about 35% of a volume defined by the cavity, and upon completion of the injection at this amount, the injection molding process is suspended for about 3 seconds. Any longer delay would result in gate freeze-off. Delayed gas assist is applied upon the expiration of the 3 second time period at a pressure of about 700 PSI. Attempts to produce an injection molded products using this method results in a blow out during application of the gas assist.

Although particular embodiments of the invention have been described in detail, it is understood that the invention is not limited correspondingly in scope, but includes all changes, modifications, and equivalents coming within the spirit and terms of the claims appended hereto.

What is claimed is:

1. A method of injection molding a foamed injection molded product, comprising:
   injecting a short shot of foamable resin through a nozzle into a cavity defined by respective inner surfaces of a plurality of molding plates at an amount from about 25% to about 35% of a volume of the cavity, the resin comprising a chemical foaming agent;
   allowing the injected resin to foam for a predetermined period of time, wherein the predetermined time is longer than about 10 seconds, during which the injected foamable resin foams and expands to substantially fill the cavity and a portion of an outer surface of the foamable resin contacts the respective inner surfaces of the plurality of molding plates; and injecting pressurized gas through the nozzle into the cavity after the predetermined time has elapsed and the injected foamable resin expands to substantially fill the cavity and a portion of an outer surface of the foamable resin contacts the respective inner surfaces of the plurality of molding plates to pack the outer surface of the foamable resin against the inner surfaces of the plurality of molding plates.

2. The method of claim 1, wherein at least about 50% of the outer surface of the foamable resin is in contact with the respective inner surfaces of the plurality of molding plates prior to injecting the pressurized gas into the cavity.

3. The method of claim 1, wherein the predetermined time is longer than about 15 seconds.

4. The method of claim 1, wherein pressure provided by the pressurized gas is maintained in the cavity for an additional predetermined time.

5. The method of claim 4, wherein the additional predetermined time is at least 2 seconds.

6. A method of injection molding a foamed injection molded product, comprising:

injecting a short shot of foamable resin through a nozzle into a cavity defined by respective inner surfaces of a plurality of molding plates at an amount from about 25% to about 35% of a volume of the cavity, the resin comprising a chemical foaming agent, wherein at least one of the plurality of molding plates comprises a gate having a diameter ranging from about 0.120 inches to about 0.250 inches;

allowing the injected resin to foam for a predetermined period of time, during which the injected foamable resin foams and expands to substantially fill the cavity and a portion of an outer surface of the foamable resin contacts the respective inner surfaces of the plurality of molding plates; and injecting pressurized gas through the nozzle into the cavity after the predetermined time has elapsed and the injected foamable resin expands to substantially fill the cavity and a portion of an outer surface of the foamable resin contacts the respective inner surfaces of the plurality of molding plates to pack the outer surface of the foamable resin against the inner surfaces of the plurality of molding plates.

7. The method of claim 1, wherein a temperature of the plurality of molding plates ranges from about 380° F. to about 400° F.

8. A method of injection molding a foamed injection molded product, comprising:

injecting a short shot of foamable resin through a nozzle into a cavity defined by respective inner surfaces of a plurality of molding plates at an amount from about 25% to about 35% of a volume of the cavity, the resin comprising a chemical foaming agent;

allowing the injected resin to foam for a predetermined period of time, during which the injected foamable resin foams and expands to substantially fill the cavity and a portion of an outer surface of the foamable resin contacts the respective inner surfaces of the plurality of molding plates; and injecting pressurized gas through the nozzle into the cavity after the predetermined time has elapsed and the injected foamable resin expands to substantially fill the cavity and a portion of an outer surface of the foamable resin contacts the respective inner surfaces of the plurality of molding plates to pack the outer surface of the foamable resin against the inner surfaces of the plurality of molding plates, wherein the foamable resin comprises:
about 80 wt % to about 90 wt % of a high density polyolefin;
about 10 wt % to about 20 wt % of a ultra low density polyolefin elastomer; and
about 2 wt % of the chemical foaming agent.

9. An injection molding apparatus for forming a foamed product, comprising:

a cavity defined by respective inner surfaces of a plurality of molding plates;

a nozzle coupled to and in fluid communication with the cavity; and a controller configured to perform the steps of:

injecting a short shot of foamable resin through the nozzle into the cavity at an amount from about 25% to about 35% of a volume of the cavity, the resin comprising a chemical foaming agent;

allowing the injected resin to foam for a predetermined period of time, wherein the predetermined time is longer than about 10 seconds, during which the injected foamable resin foams and expands to substantially fill the cavity and a portion of an outer surface of the foamable resin contacts the respective inner surfaces of the plurality of molding plates; and injecting the pressurized gas through the nozzle into the cavity after the predetermined time has elapsed and the injected foamable resin expands to substantially fill the cavity and a portion of an outer surface of the foamable resin contacts the respective inner surfaces of the plurality of molding plates to pack the skinned outer surface of the foamable resin against the inner surfaces of the plurality of molding plates.

10. The injection molding apparatus of claim 9, wherein at least about 50% of the outer surface of the foamable resin is in contact with the respective inner surfaces of the plurality of molding plates prior to injecting the pressurized gas into the cavity.

11. The injection molding apparatus of claim 9, wherein the controller is configured to maintain pressure provided by the pressurized gas in the cavity for an additional predetermined time.

12. The injection molding apparatus of claim 11, wherein the additional predetermined time is at least 2 seconds.

13. An injection molding apparatus for forming a foamed product, comprising:

a cavity defined by respective inner surfaces of a plurality of molding plates, wherein at least one of the plurality of molding plates comprises a gate having a diameter ranging from about 0.120 inches to about 0.250 inches;

a nozzle coupled to and in fluid communication with the cavity; and a controller configured to perform the steps of:

injecting a short shot of foamable resin through the nozzle into the cavity at an amount from about 25% to about 35% of a volume of the cavity, the resin comprising a chemical foaming agent;

allowing the injected resin to foam for a predetermined period of time, wherein the predetermined time is longer than about 10 seconds, during which the injected foamable resin foams and expands to substantially fill the cavity and a portion of an outer surface of the foamable resin contacts the respective inner surfaces of the plurality of molding plates; and injecting the pressurized gas through the nozzle into the cavity after the predetermined time has elapsed and the injected foamable resin expands to substantially fill the cavity and a portion of an outer surface of the foamable resin contacts the respective inner surfaces of the plurality of molding plates to pack the skinned outer surface of the foamable resin against the inner surfaces of the plurality of molding plates.

14. The injection molding apparatus of claim 9, wherein a temperature of the plurality of molding plates ranges from about 380° F. to about 400° F.

15. The method of claim 6, wherein a temperature of the plurality of molding plates ranges from about 380° F. to about 400° F.

16. The method of claim 8, wherein a temperature of the plurality of molding plates ranges from about 380° F. to about 400° F.

17. The method of claim 6, wherein at least about 50% of the outer surface of the foamable resin is in contact with the respective inner surfaces of the plurality of molding plates prior to injecting the pressurized gas into the cavity.

18. The method of claim 6, wherein pressure provided by the pressurized gas is maintained in the cavity for an additional predetermined time, and wherein the additional predetermined time is at least 2 seconds.

19. The method of claim 8, wherein pressure provided by the pressurized gas is maintained in the cavity for an additional predetermined time, and wherein the additional predetermined time is at least 2 seconds.

20. The injection molding apparatus of claim 13, wherein the controller is configured to maintain pressure provided by the pressurized gas in the cavity for an additional predetermined time, and wherein the additional predetermined time is at least 2 seconds.

* * * * *